(12) United States Patent
Spoerri

(10) Patent No.: US 12,190,458 B2
(45) Date of Patent: Jan. 7, 2025

(54) DEVICE AND METHOD FOR PROVIDING AUGMENTED REALITY CONTENT

(71) Applicant: MENTAR HOLDING AG, Hünenberg (CH)

(72) Inventor: Reto Spoerri, Zürich (CH)

(73) Assignee: MENTAR HOLDING AG, Hünenberg (CH)

( * ) Notice: Subject to any disclaimer, the term of this patent is extended or adjusted under 35 U.S.C. 154(b) by 0 days.

(21) Appl. No.: 17/906,845

(22) PCT Filed: Mar. 22, 2021

(86) PCT No.: PCT/EP2021/057297
§ 371 (c)(1),
(2) Date: Sep. 20, 2022

(87) PCT Pub. No.: WO2021/191158
PCT Pub. Date: Sep. 30, 2021

(65) Prior Publication Data
US 2023/0141545 A1  May 11, 2023

(30) Foreign Application Priority Data
Mar. 23, 2020 (CH) .................................. 00342/20

(51) Int. Cl.
*G06T 19/00* (2011.01)
*H04W 4/02* (2018.01)

(52) U.S. Cl.
CPC ............. *G06T 19/006* (2013.01); *H04W 4/02* (2013.01)

(58) Field of Classification Search
CPC ................ G06T 19/006; H04W 4/02
(Continued)

(56) References Cited

U.S. PATENT DOCUMENTS

2011/0029401 A1* 2/2011 Granger ............. G06Q 30/0623
705/26.7
2012/0231814 A1 9/2012 Calman et al.
(Continued)

FOREIGN PATENT DOCUMENTS

EP    3062281 A1    8/2016
WO    WO 2020/025142 A1    2/2020

OTHER PUBLICATIONS

International Search Report and Written Opinion of the International Searching Authority for International Application No. PCT/EP2021/057297, mailed on Jun. 4, 2021, in 15 pages.
(Continued)

*Primary Examiner* — Thomas J Lett
(74) *Attorney, Agent, or Firm* — Knobbe, Martens, Olson & Bear, LLP

(57) ABSTRACT

A mobile communication device comprises an electronic circuit configured to determine a location of a user, transmit a query request to a computerized virtual real estate directory system, and receive therefrom a query response. The query response comprises one or more virtual real estate objects assigned to a virtual real estate object location within a predefined region around the user. The mobile communication device transmits for at least one particular virtual real estate object a content request to an augmented reality content server 5 defined in the query response. The mobile communication device receives from the augmented reality content server augmented reality content and plays the augmented reality content for the particular virtual real estate object.

16 Claims, 6 Drawing Sheets

(58) Field of Classification Search
USPC .......................................................... 345/419
See application file for complete search history.

(56) References Cited

U.S. PATENT DOCUMENTS

| | | | |
|---|---|---|---|
| 2017/0353658 A1* | 12/2017 | Colin | H04N 23/698 |
| 2018/0159838 A1 | 6/2018 | Dintenfass | |
| 2019/0035165 A1* | 1/2019 | Gausebeck | G06T 17/00 |
| 2020/0372721 A1* | 11/2020 | Salminen | H04L 67/52 |
| 2021/0150649 A1* | 5/2021 | Holey | G06T 19/00 |
| 2022/0189075 A1* | 6/2022 | Lynch | G06T 11/00 |

OTHER PUBLICATIONS

International Search Report and Written Opinion of the International Searching Authority for International Application No. PCT/EP2021/057306, mailed on Jun. 7, 2021, in 13 pages.

* cited by examiner

DEVICE AND METHOD FOR PROVIDING AUGMENTED REALITY CONTENT

CROSS-REFERENCE TO RELATED APPLICATIONS

This application is the U.S. National Phase under 35 U.S.C. § 371 of International Application No. PCT/EP2021/057297, filed Mar. 22, 2021, titled DEVICE AND METHOD FOR PROVIDING AUGMENTED REALITY CONTENT, which claims priority to CH Patent Application No. 00342/20, filed Mar. 23, 2020, the entirety of each of which is hereby expressly incorporated by reference herein.

FIELD OF THE INVENTION

The present invention relates to a device and method for providing augmented reality content. Specifically, the present invention relates to a device, a method, and a computer program product for providing augmented reality content.

BACKGROUND OF THE INVENTION

Augmented Reality (AR) is a technology for enhancing a real-world environment with virtual computer-generated information. As opposed to virtual reality (VR), AR does not replace the real-world with a computer-generated world, but adds computer-generated information to the real-world, often by overlaying virtual content onto real-world objects. The virtual content can encompass not only visual content (e.g. digital images and models) which are overlaid onto real-world objects, enhancing the visual experience of the real-world, but can also encompass auditory content, haptic content, olfactory content, and content involving other sensory modalities.

Hardware devices for playing back augmented reality content, such as virtual objects, are typically mobile and carried or worn by a user. These mobile devices can be wearable devices, such as headsets with eyepieces, smartglasses, or the like, which overlay augmented reality content onto an eyepiece through which the user can then see both the real-world and projected visual content. These mobile devices can also be mobile phones such as smart-phones, where an image captured by a camera of the mobile phone is displayed live on a display of the mobile phone while simultaneously displaying augmented reality content on the display. The mobile phones may be supported by additional connected devices to play back augmented reality content, such as headphones for auditory content and gloves for providing precise motion tracking and haptic feedback.

For large-scale augmented reality environments, it is not practical to store all augmented reality content locally on the mobile device, because mobile devices have only limited local storage capabilities and because augmented reality content may be subject to change and update. Due to the high data transmission rates available via mobile data networks, providing augmented reality content on demand has become practical.

SUMMARY OF THE INVENTION

It is an object of this invention to provide a device and method for providing augmented reality content. Specifically, the present invention relates to a device, a method, and a computer program product for providing augmented reality content to a mobile communication device of a user.

According to the present invention, these objects are achieved through the features of the independent claims. In addition, further advantageous embodiments follow from the dependent claims and the description.

According to the present invention, the above-mentioned objects are particularly achieved by a mobile communication device, comprising an electronic circuit configured to determine a location of a user of the mobile communication device and transmit a query request via a communication network to a computerized virtual real estate directory system, the query request comprising at least the location of the user. The electronic circuit is configured to receive from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server. The electronic circuit is configured to transmit for at least one particular virtual real estate object a content request via the communication network to one of the augmented reality content servers, respectively using the network address of the augmented reality content server, each content request comprising the identification information of the particular virtual real estate object. The electronic circuit is configured to receive from the augmented reality content server via the communication network augmented reality content for the particular virtual real estate object, and play the augmented reality content for the particular virtual real estate object.

In an embodiment, the mobile communication device further comprises a display and the electronic circuit is configured to play the augmented reality content by rendering, on the display, the augmented reality content.

In an embodiment, the mobile communication device further comprises an audio module and the electronic circuit is configured to play the augmented reality using the audio module.

In an embodiment, the electronic circuit is further configured to verify whether the augmented reality content is entirely contained within a bounding volume of the virtual real estate object, and responsive to positive verification, play the augmented reality content, and responsive to negative verification to either: not play the augmented reality content or modify the augmented reality content and play on the display modified augmented reality content fitting within the bounding volume of the virtual real estate object.

In an embodiment, the mobile communication device further comprises a camera and the electronic circuit is configured to further determine a field of view of the user and/or of the camera and to transmit the query request further comprising the field of view.

In an embodiment, the electronic circuit is further configured to determine from the field of view coordinates of real-world features in the field of view relative to the location of the user and transmit, in the query request, the coordinates of the real-world features.

In an embodiment, the electronic circuit is further configured to receive from a content identity server, via the communication network, at least one cryptographic key assigned to the at least one augmented reality content server, respectively, receive from the at least one augmented reality content server via the communication network signed augmented reality content for the virtual real estate objects; and validate the signed augmented reality content received from the at least one augmented reality content server using the corresponding at least one cryptographic key.

In addition to the mobile communication device for providing augmented reality content, the present invention also relates to a method for providing augmented reality content to a user of a mobile communication device having an electronic circuit, the method comprising: determining in the mobile communication device a location of the user of the mobile communication device and transmitting from the mobile communication device a query request via a communication network to a computerized virtual real estate directory system, the query request comprising at least the location of the user. The method comprises receiving in the mobile communication device from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server. The method comprises transmitting from the mobile communication device for at least one particular virtual real estate object a content request via the communication network to one of the augmented reality content servers, respectively using the network address of the augmented reality content server, each content request comprising the identification information of the particular virtual real estate object. The method comprises receiving in the mobile communication device from the augmented reality content server via the communication network the augmented reality content for the particular virtual real estate object; and playing in the mobile communication device the augmented reality content for the particular virtual real estate object.

In an embodiment, the mobile communication device comprises a display and playing the augmented reality content comprises rendering, on the display, the augmented reality content.

In an embodiment, the mobile communication device comprises an audio module and playing the augmented reality content comprises playing the augmented reality content using the audio module.

In an embodiment, the method further comprises verifying in the mobile communication device whether the augmented reality content is entirely contained within a bounding volume of the virtual real estate object, and responsive to positive verification, playing the augmented reality content; and responsive to negative verification either: not playing the augmented reality content or modifying in the mobile communication device the augmented reality content and playing modified augmented reality content fitting within the bounding volume of the virtual real estate object.

In an embodiment, the method further comprises determining in the mobile communication device a field of view of the user and/or of a camera of the mobile communication device and transmitting from the mobile communication device the query request further comprising the field of view.

In an embodiment, the method further comprises determining, in the mobile communication device, from the field of view coordinates of real-world features in the field of view relative to the location of the user and transmitting, from the mobile communication device, in the query request, the coordinates of the real-world features.

In an embodiment, the method further comprises receiving in the mobile communication device from a content identity server, via the communication network, at least one cryptographic key assigned to the at least one augmented reality content server, respectively. The method comprises receiving in the mobile communication device from the at least one augmented reality content server via the communication network signed augmented reality content for the virtual real estate objects, and validating in the mobile communication device the signed augmented reality content received from the at least one augmented reality content server using the corresponding at least one cryptographic key.

In addition to the device and the method for determining for providing augmented reality content, the present invention also relates to a computer program product comprising a non-transitory computer-readable medium having stored thereon computer program code configured to control an electronic circuit of a mobile communication device such that the mobile communication device performs a number of steps comprising determining in the mobile communication device a location of the user of the mobile communication device and the step of transmitting from the mobile communication device a query request via a communication network to a computerized virtual real estate directory system, the query request comprising at least the location of the user. The steps comprise receiving in the mobile communication device from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server. The steps comprise transmitting from the mobile communication device for at least one particular virtual real estate object a content request via the communication network to one of the augmented reality content servers, respectively using the network address of the augmented reality content server, each content request comprising the identification information of the particular virtual real estate object. The steps comprise receiving in the mobile communication device from the augmented reality content server via the communication network the augmented reality content for the particular virtual real estate object; and playing in the mobile communication device the augmented reality content for the particular virtual real estate object.

In an embodiment, the mobile communication device comprises a display and the computer program code is configured to control the electronic circuit of the mobile communication device such that the step of playing the augmented reality content comprises rendering, on the display, the augmented reality content.

In an embodiment, the mobile communication device comprises an audio module and the computer program code is configured to control the electronic circuit of the mobile communication device such that the step of playing the augmented reality content comprises playing the augmented reality content using the audio module.

In an embodiment, the computer program code is further configured to control the electronic circuit of the mobile communication device such that the steps further comprise verifying in the mobile communication device whether the augmented reality content is entirely contained within a bounding volume of the virtual real estate object, and responsive to positive verification, playing the augmented reality content; and responsive to negative verification either: not playing the augmented reality content or modifying in the mobile communication device the augmented reality content and playing modified augmented reality content fitting within the bounding volume of the virtual real estate object.

In an embodiment, the computer program code is further configured to control the electronic circuit of the mobile communication device such that the steps further comprise determining in the mobile communication device a field of view of the user and/or of a camera of the mobile communication device and transmitting from the mobile communication device the query request further comprising the field of view.

In an embodiment, the computer program code is further configured to control the electronic circuit of the mobile communication device such that the steps further comprise determining, in the mobile communication device, from the field of view coordinates of real-world features in the field of view relative to the location of the user and transmitting, from the mobile communication device, in the query request, the coordinates of the real-world features.

In an embodiment, the computer program code is further configured to control the electronic circuit of the mobile communication device such that the steps further comprise receiving in the mobile communication device from a content identity server, via the communication network, at least one cryptographic key assigned to the at least one augmented reality content server, respectively. The steps further comprise receiving in the mobile communication device from the at least one augmented reality content server via the communication network signed augmented reality content for the virtual real estate objects, and validating in the mobile communication device the signed augmented reality content received from the at least one augmented reality content server using the corresponding at least one cryptographic key.

BRIEF DESCRIPTION OF THE DRAWINGS

The present invention will be explained in more detail, by way of example, with reference to the drawings in which:

FIG. 2: shows a diagram illustrating schematically a user with a mobile communication device, a computerized virtual real estate directory system, augmented reality content servers, and the networks lying there between.

DETAILED DESCRIPTION OF THE PREFERRED EMBODIMENTS

Figure 1:
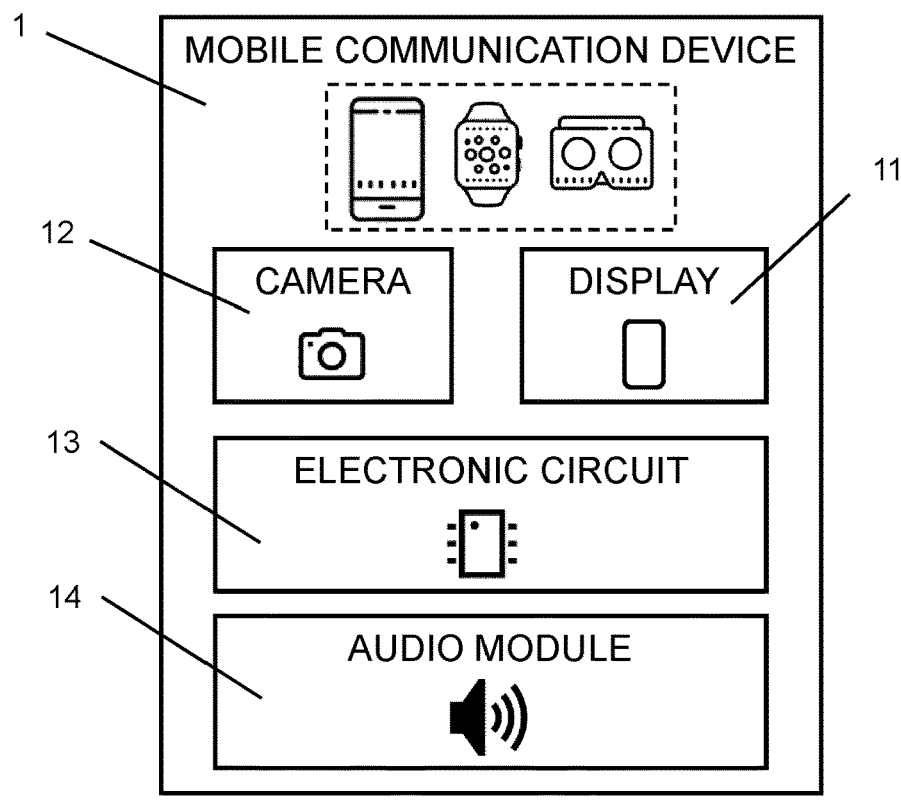
FIG. 1: shows a block diagram illustrating schematically a mobile communication device for providing augmented reality content to a user.

In FIG. 1, reference numeral 1 refers to a mobile communication device 1 comprising an electronic circuit 13. Depending on the embodiment, the mobile communication device 1 includes various further modules, such as a display 11, a camera 12, an audio module 14, a memory, a communication interface, a battery, a location module, an orientation module, and/or a user interface. The user interface can be integrated into the display 11 in the form of a touch-sensitive display. The modules of the mobile communication device 1 are connected to each other via a data connection mechanism, such that they can transmit and/or receive data. Alternatively, or in addition, one or more of the modules of the mobile communication device 1 are integrated into the electronic circuit 13. The communication interface of the mobile communication device 1 is configured for wireless communication with remote servers via a communication network 3. The communication network 3 comprises the Internet as well as other intermediary networks. The wireless communication takes place using a mobile data network, such as GSM, CDMA and LTE networks, and/or a close range wireless communication interface using a Wi-Fi network, Bluetooth, and/or other wireless network types and standards. In an embodiment, the mobile communication device 1 further comprises accessory modules, including headphones, displays, such as head-mounted displays and/or smart-glasses, and/or haptic gloves. These accessory modules are configured to exchange data with the mobile communication device 1 via a data connection mechanism.

The term data connection mechanism relates to a mechanism that facilitates data communication between two components, devices, systems, or other entities. In an embodiment, the data connection mechanism is wired, such as a cable or system bus. In an embodiment, the data connection mechanism includes wireless communication, such that some components of the mobile communication device are physically separated from each other and exchange data with each other wirelessly, using a Bluetooth standard, for example. For example, one part of the mobile communication device 1 comprises an eyepiece, while another part comprises a device worn as a bracelet on the wrist.

Depending on the embodiment, the electronic circuit 13 comprises a system on a chip (SoC), a central processing unit (CPU), and/or other more specific processing units such as a graphical processing unit (GPU), application specific integrated circuits (ASICs), reprogrammable processing units such as field programmable gate arrays (FPGAs), as well as processing units specifically configured to accelerating certain applications, such as AI (Artificial Intelligence) accelerators for accelerating neural network and/or machine learning processes.

The memory comprises one or more volatile and or non-volatile storage components. The storage components may be removable and/or non-removable, and can also be integrated, in whole or in part with the mobile communication device 1. Examples of storage components include RAM (Random Access Memory), flash memory, hard disks, data memory, and/or other data stores. The data storage system comprises a non-transitory computer-readable medium having stored thereon computer program code configured to control the electronic circuit 13, such that the mobile communication device 1 performs one or more steps and/or functions as described herein. Depending on the embodiment, the computer program code is compiled or non-compiled program logic and/or machine code. As such, the mobile communication device 1 is configured to perform one or more steps and/or functions. The computer program code defines and/or is part of a discrete software application. One skilled in the art will understand, that the computer program code can also be distributed across a plurality of software applications. In an embodiment, the computer program code further provides interfaces, such as APIs (Application Programming Interfaces), such that functionality and/or data of the mobile communication device 1 can be accessed remotely, such as via a client application or via a web browser. In an embodiment, the computer program code is configured such that one or more steps and/or functions are not performed in the mobile communication device 1 but in a separate computer system, remote from the mobile communication device 1.

In an embodiment, the mobile communication device 1 is a mobile phone. The mobile phone, for example a smartphone running the Android operating system or the iOS operating system, is configured to download and install the computer program code from a server, for example from an App store. Further examples of mobile communication devices 1 are tablet computers, smartwatches and the like.

In an embodiment, the mobile communication device 1 is a wearable device, such as a wearable glass device (also called smart glasses) or head-mounted device. Smart glasses are electronic devices worn in a similar fashion to traditional glasses, however they feature a display 11 integrated into the glasses and enable hands-free use. In an embodiment, the smart glasses additionally comprise a camera 12 for capturing images.

In an embodiment, a computer emulates the mobile communication device 1 and provides the mobile communication device 1 with emulated inputs to simulate a mobile communication device 1 in the real-world.

In an embodiment, the display module 11 of the mobile communication device 1 comprises an electronic display, such as a flat or curved LED or OLED screen.

In an embodiment, the display module 11 of the mobile communication device 1 comprises a projector, such as a projector configured to project images onto an eyepiece.

In an embodiment, the audio module 14 is configured to play back audio content, and comprises an electro-acoustic transducer, such as a loudspeaker or a headphone.

In an embodiment, the audio module 14 is configured to transmit audio content, via a wired or wireless connection, to an external loudspeaker or set of headphones.

The orientation module of the mobile communication device 1 captures the orientation of the user 2 and/or of the mobile communication device 1 and can comprise a compass, accelerometers, gyroscopic sensors, etc.

The user interface enables the user 2 to interact with the mobile communication device 1. In particular, the user interface enables the user 2 to enter data into the mobile communication device 1. Examples of the user interface comprise a touch-sensitive display integrated into the display 11, hardware buttons such as a keyboard, and a microphone for capturing voice commands of the user 2. In an embodiment, the user interface further uses other modules, such as the camera, for capturing movement and/or gestures of the user 2 as user input.

Figure 2:
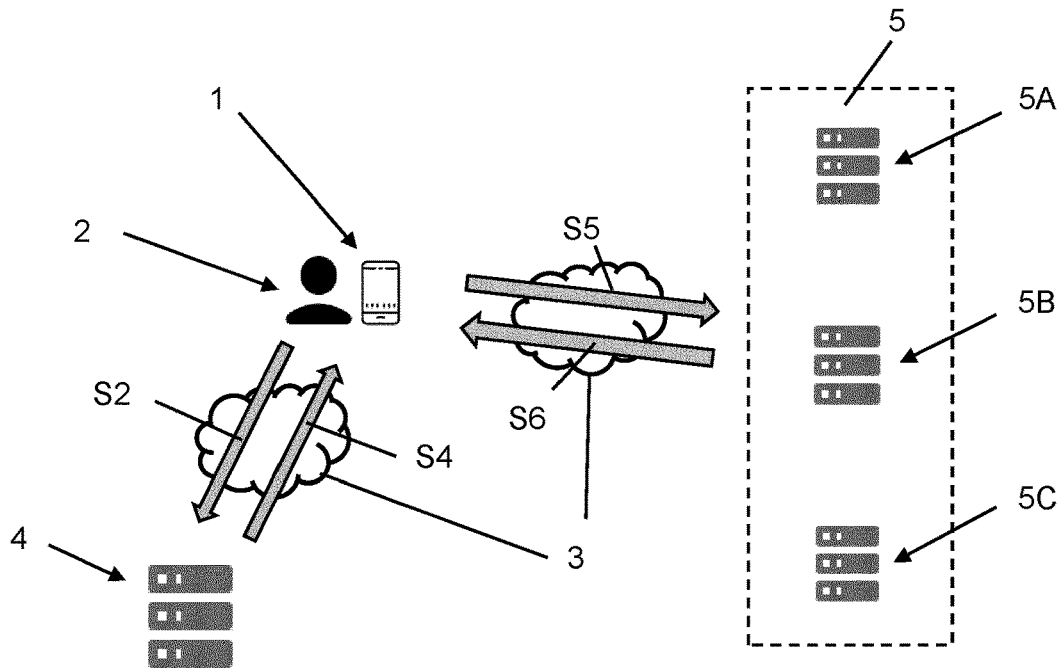

FIG. 2 shows a diagram illustrating schematically a user 2 with the mobile communication device 1, a computerized virtual real estate directory system 4, augmented reality content servers 5, 5A, 5B, 5C, and the communication network 3 via which communication takes place between the mobile communication device 1 and the virtual real estate directory system 4, and the mobile communication device 1 and the augmented reality content servers 5, 5A, 5B, 5C. Steps S2, S4, S5, and S6 are also shown and are explained below in more detail with reference to FIG. 8. The user 2 carries, on his or her person, the mobile communication device 1.

In an embodiment where the mobile communication device 1 is a wearable device, the user 2 wears the mobile communication device 1, for example as a headpiece or eyepiece.

By separating the virtual real estate directory system 4 and the augmented reality content servers 5, 5A, 5B, 5C, the virtual real estate directory system 4 can be configured for quick and efficient determining of virtual real estate objects 41. The ownership and governance of the virtual real estate directory system 4 is therefore separated from the ownership and governance augmented reality content servers 5, 5A, 5B, 5C. The virtual real estate directory system 4 provides relatively little data to the mobile communication device 1, whereas the augmented reality content servers 5, 5A, 5B, 5C provide relatively larger amounts of data to the mobile communication device 1. Therefore, a relatively denser and more local provision of augmented reality content servers 5, 5A, 5B, 5C than servers of the virtual real estate directory system 4 enable an efficient distribution of servers and enable the relatively larger amounts of data to be provided by the augmented reality content servers 5, 5A, 5B, 5C to the mobile communication device 1 with lower transmission latency and greater bandwidth.

Figure 3:
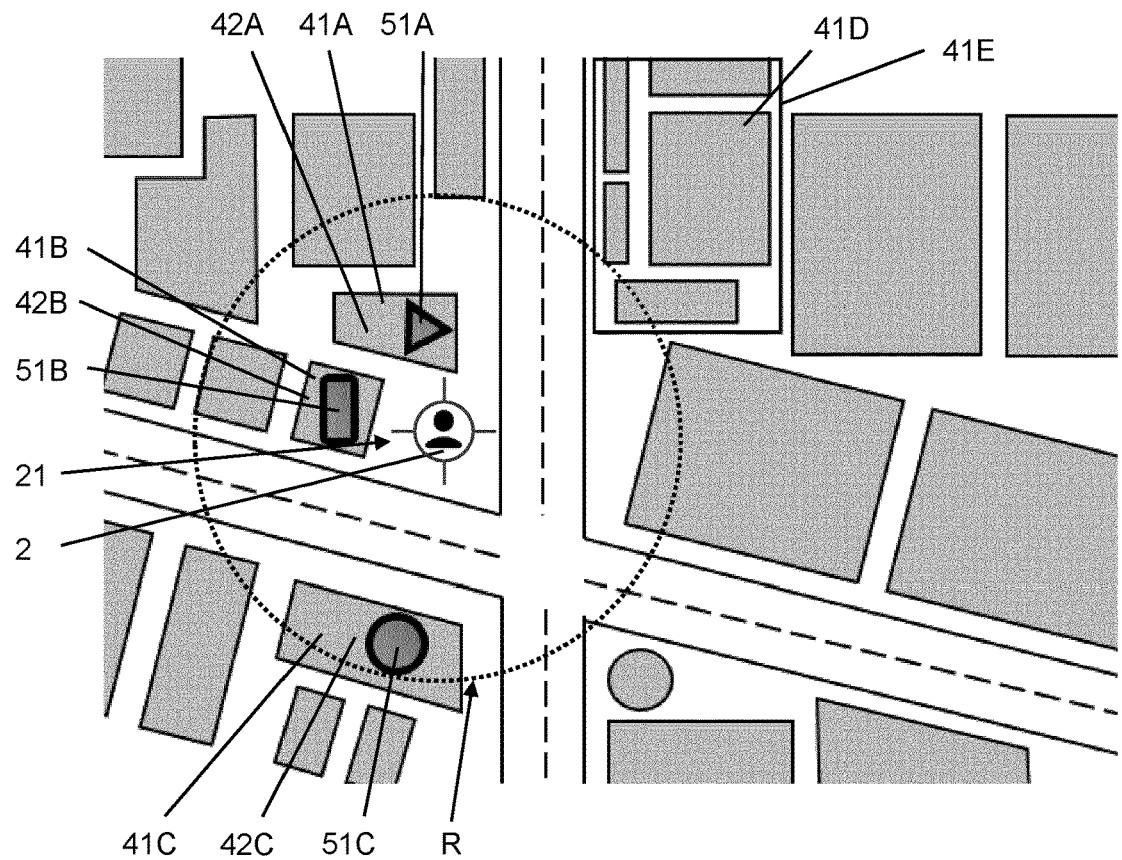
FIG. 3: shows a drawing illustrating schematically a plan view with a user in an urban environment comprising virtual real estate objects and augmented reality content.

FIG. 3 shows a drawing illustrating schematically a plan view of an urban environment comprising virtual real estate objects 41A, 41B, 41C, augmented reality content 51A, 51B, 51C, and the user 2 at a location 21. The location 21 is a physical geographic location of the user 2 and can be described by coordinates in a coordinate system. For example, the coordinate system is a geographic coordinate system described by spherical coordinates, i.e. latitude and longitude, projected coordinate systems, such as universal transverse Mercator (UTM) or the like. National coordinate systems, such as the Swiss coordinate system, can also be used to describe the location 21 of the user 2. In an embodiment, corrections to the location 21 of the user 2 are provided to compensate for continental drift.

In an embodiment where the mobile communication device 1 is emulated, the location 21 of the user 2 is an emulated location.

A region R around the user 2 is defined as a two-dimensional or three-dimensional space in which the user 2 is located. Depending on the embodiment or configuration, the region R is a geometric object such as a sphere centered on the location 21 of the user 2, a rectangle with the user 2 inside. In an embodiment, the region R is defined in terms of a direction in which the user 2 is oriented, such that the region R extends further from the user 2 in the direction in which the user 2 is oriented (e.g. facing and/or looking) than in the directions in which the user 2 is not oriented.

Figure 4:
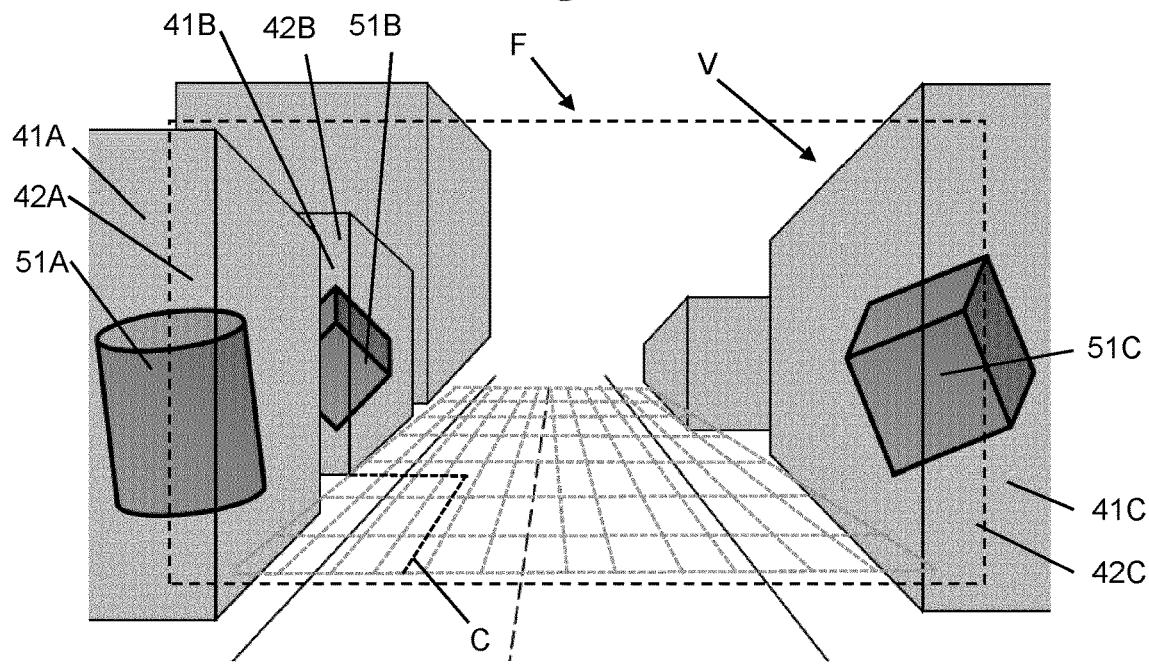
FIG. 4: shows a drawing illustrating schematically a field of view of a user in an urban environment comprising virtual real estate objects and augmented reality content.

The real-world space is virtually divided into a hierarchy of virtual real estate objects 41A, 41B, 41C arranged similarly to a tree data structure, and in which parent virtual real estate objects comprise child virtual real estate objects. The hierarchy comprises a plurality of levels. Virtual real estate objects 41A, 41B, 41C at higher levels cover larger geographic areas, such as a country, state, or city. Virtual real estate objects 41A, 41B, 41C at lower levels cover smaller areas, such as city squares, blocks, buildings. At even lower levels, virtual real estate objects 41A, 41B, 41C cover even smaller spaces such as stories of buildings, shops, individual rooms, and/or individual compartments or shelves in rooms. For the purposes of illustration, virtual real estate objects 41A, 41B and 41C are shown in FIG. 4. In one example, the virtual real estate objects 41A, 41B, 41C are 3D objects defined by a set of polygons, a set of edges and vertices, and/or voxels. In another example, virtual real estate objects 41A, 41B, 41C are 2D objects described by a set of lines and/or a set of points which define a virtual fence around the virtual real estate object 41A, 41B, 41C. Further illustrated are virtual real estate objects 41D and 41E, wherein the virtual real estate object 41E comprises the virtual real estate object 41D.

Each virtual real estate object 41A, 41B, 41C is assigned a virtual real estate object location 42A, 42B, 42C in the virtual real estate directory system 4, which associates the virtual real estate object 41A, 41B, 41C with a real-world location whereby the virtual real estate object location 42A, 42B, 42C is described by coordinates in a coordinate system. As above for the location 21 of the user 2, the coordinate system uses, for example, spherical coordinates or projected coordinates, based on a local or national coordinate system. In an embodiment, the coordinates are further corrected to account for continental drift or other sources of error.

Augmented reality content 51A, 51B, 51C is located inside a virtual real estate object 41A, 41B, 41C. Each piece of augmented reality content 51A, 51B, 51C is assigned to a particular virtual real estate object 41A, 41B, 41C. A virtual real estate object 41, 41A, 41B, 41C, however, may comprise one or more pieces of augmented reality content 51A, 51B, 51C. The augmented reality content 51A, 51B, 51C comprises sensory content of one or more sensory modalities, such as visual content, haptic content, and auditory content. For example, a piece of augmented reality content 51A, 51B, 51C comprises visual content, e.g. in a 3D model described by a set of polygons, along with auditory content, e.g. as described by an audio track. In an embodiment, beyond the 3D model, augmented reality content 51A, 51B, 51C comprises dynamic content, interactive content with which the user 2 can interact, and so forth.

The augmented reality content 51A, 51B, 51C is played back to the user 2 on the mobile communication device 1. Depending on the particular hardware configuration of the mobile communication device 1, e.g. which type of device the mobile communication device 1 is, which modules the mobile communication device 1 comprises, and which accessory modules the mobile communication device 1 is connected to, the playback of the augmented reality content 51A, 51B, 51C comprises playing back one or more types of sensory content as described in more detail with reference to FIG. 8.

FIG. 4 shows a drawing illustrating schematically a field of view of the user 2 in an urban environment, comprising virtual real estate objects 41, 41A, 41B, 41C and augmented reality content 51, 51A, 51B, 51C. Each virtual real estate object 41, 41A, 41B, 41C has a bounding volume V which is a closed volume which contains the virtual real estate object 41, 41A, 41B, 41C. The bounding volume V is defined using polygons, vertices and edges, and/or other geometric objects. The bounding volume V being a closed volume means that a given point cannot move from inside the bounding volume V to outside the bounding volume V without passing through a surface of the bounding volume V.

In one example, the bounding volume V exactly matches the shape of the virtual real estate object 41, 41A, 41B, 41C. In another example, the bounding volume V is a relatively simpler shape than the relatively more complex virtual real estate object 41, 41A, 41B, 41C, meaning it is described with less polygons and/or less vertices and edges than the virtual real estate object 41, 41A, 41B, 41C. However, it is ensured that the bounding volume V entirely contains the virtual real estate object 41, 41A, 41B, 41C, e.g. no points of the virtual real estate object 41, 41A, 41B, 41C lie outside the bounding volume V. In an embodiment, the bounding volume V is a rectangular prism.

A field of view F is indicated by the dashed lines. The field of view F is defined, for example, by a solid angle with its vertex at the user 2 or at the mobile communication device 1. Alternatively, the field of view is defined as a rectangular pyramid with a horizontal angle and vertical angle and a vertex at the user 2 of the mobile communication device 1.

In an embodiment, the field of view F is defined using a field of view of the camera 12 of the mobile communication device 1. Additionally, an accelerometer and/or gyroscopic sensor of the mobile communication device 1 are used by the mobile communication device 1 to determine an orientation of the mobile communication device 1. The orientation of the mobile communication device 1 is then used to determine the field of view F.

In an embodiment, the field of view F is defined as the field of view of the user 2 by determining, using the orientation module of the mobile communication device 1, an orientation of the user 2, for example a body orientation of the user 2, a head orientation of the user 2, and/or an eye orientation of the user 2. Depending on the embodiment, the orientation module of the mobile communication device 1 comprises a head-tracker, eye-tracker, or other component(s) to detect an orientation of the user 2.

Using the field of view F, in an embodiment, coordinates C are overlaid onto the real-world, enabling coordinates of real-world objects and features to be extracted from the field of view F. For example, the camera 12 of the mobile communication device 1 captures the field of view F as one or more images, and the mobile communication device 1 extracts from the one or more images points, edges, and other features of real-world objects, such as corners of buildings, street edges, the horizon, and other persons, and stores these extracted features. The extracted features are used by the mobile communication device 1, for example, to improve a calculated location of the user 2, improve a determined orientation of the user 2 or of the mobile communication device 1, and/or improve the positioning and playback of augmented reality content 51A, 51B, 51C.

Figure 5:
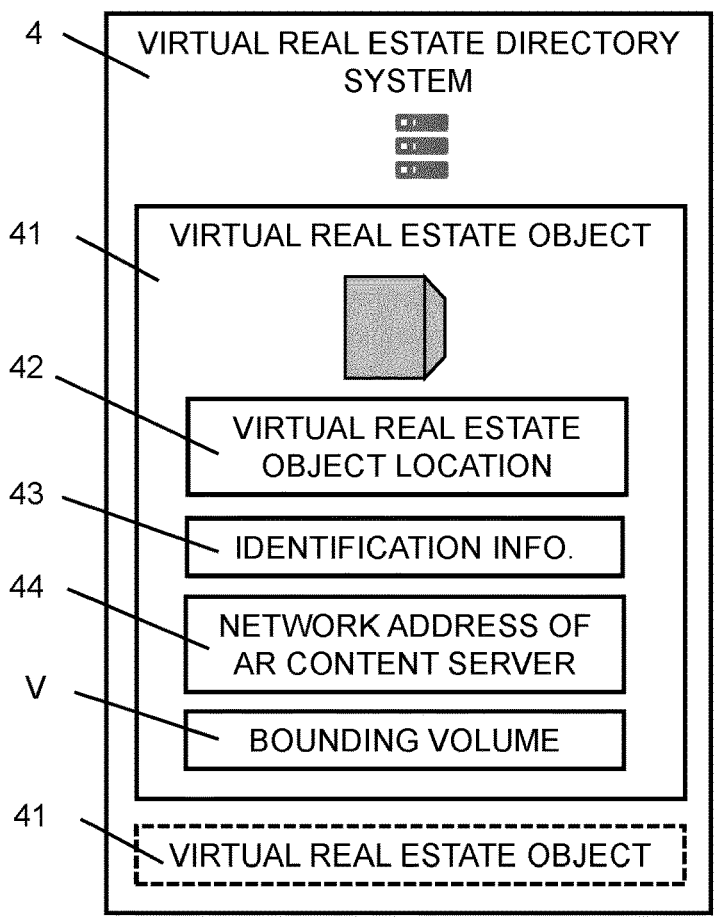
FIG. 5: shows a block diagram illustrating schematically a virtual real estate directory system.

FIG. 5 shows a block diagram illustrating schematically a virtual real estate directory system 4. The virtual real estate directory system 4 is implemented using a server computer system comprising one or more server computers. The server computers of the virtual real estate directory system 4 are located at the same location or are distributed, i.e. located remotely from one another at different locations. The server computers of the virtual real estate directory system 4 comprise one or more processors, memory, and communication interfaces for exchanging data with other systems and/or devices using the communication network 3. For example, the virtual real estate directory system 4 exchanges data with the mobile communication device 1 using the communication network 3. The virtual real estate directory system 4 is implemented on server computers as a hierarchical system and/or hierarchical database which comprise virtual real estate objects 41.

As explained above in relation to FIG. 3, the real-world space is virtually divided into a hierarchy of virtual real estate objects 41, 41A, 41B, 41C with virtual real estate objects 41, 41A, 41B, 41C at higher levels covering large geographic areas, such as a country, state, or city and virtual real estate objects 41, 41A, 41B, 41C at lower levels covering smaller areas. The virtual real estate directory system 4 is arranged in a similar hierarchy with one or more high level server computers comprising higher level virtual real estate objects 41, 41A, 41B, 41C, and one or more low level server computers comprising low level virtual real estate objects 41, 41A, 41B, 41C. In an embodiment, the server computers are located in the same location or area as the virtual real estate objects 41, 41A, 41B, 41C they store. For example, the server computer comprising virtual real estate objects 41, 41A, 41B, 41C for a specific country is located in that same country, and the server computer comprising virtual real estate objects 41, 41A, 41B, 41C for a specific city is located in that same city.

The virtual real estate object 41 comprises the virtual real estate object location 42, identification information 43 which uniquely identifies the virtual real estate object 41, a network address of an augmented reality content server 44, and the bounding volume V. The identification information 43 comprises at least: an identifier which uniquely identifies the virtual real estate object 41 or a hash value of the virtual real estate object 41. The hash value is generated by hashing the virtual real estate object 41 or one or more components thereof. Additionally, the virtual real estate object 41 comprises information relating to an owner and/or assignee of the virtual real estate object, and 3D content relating to a more complex boundary of the virtual real estate object 41. Depending on its hierarchical level, a given virtual real estate object 41 comprises identification information of child virtual real estate objects 41 which are contained in the given virtual real estate object 41, and identification information of parent virtual real estate objects 41 of which the given virtual real estate object 41 is itself a child virtual real estate object 41. This enables an efficient mapping and traversing of virtual real estate objects 41 in the virtual real estate directory system 4.

In an embodiment, the identification information 43 comprises and/or defines the bounding volume V. In a further embodiment, the identification information 43 comprises one or more of the following: the identifier, the hash value, the bounding volume V, or the virtual real estate object location 42.

Figure 6:
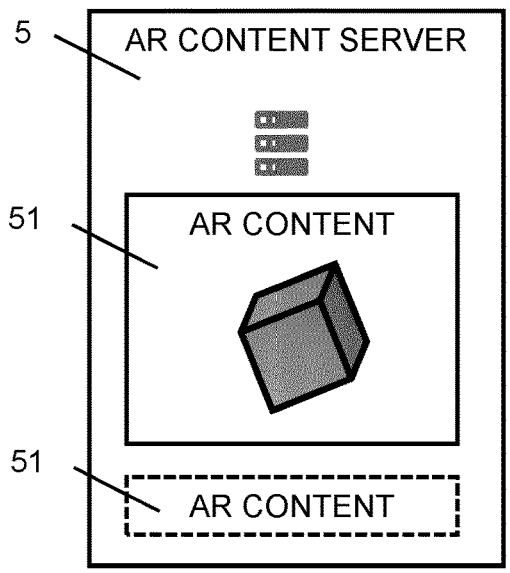
FIG. 6: shows a block diagram illustrating schematically an augmented reality content server comprising augmented reality content.

FIG. 6 shows a block diagram illustrating schematically an augmented reality content server 5 comprising augmented reality content 51. The augmented reality content server 5 comprises one or more server computers. The server computers of the augmented reality content server 5 comprise one or more processors, memory, and communication interface for exchanging data with other systems and/or devices using the communication network 3. For example, the augmented reality content server 5 exchanges data with the mobile communication device 1 using the communication network 3. The augmented reality content server 5 is separate from the virtual real estate directory system 4. For example, the augmented reality content server 5 is located near the location to which the virtual real estate object 41 is assigned. The augmented reality content 51 comprises sensory content of one or more sensory modalities, as described above in relation to FIG. 3.

In an embodiment, the augmented reality content server 5 is located at the same location as the virtual real estate directory system 4 and/or is implemented on servers of the virtual real estate directory system 4.

Figure 7:
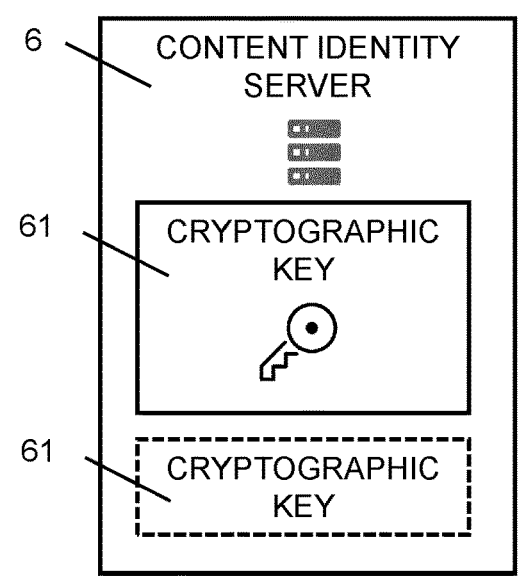
FIG. 7: shows a block diagram illustrating schematically a content identity server.

FIG. 7 shows a block diagram illustrating schematically a content identity server 6 comprising cryptographic keys 61. The content identity server 6 comprises one or more server computers. The server computers of the content identity server 6 comprise one or more processors, memory, and communication interface for exchanging data with other systems and/or devices using the communication network 3. For example, the content identity server 6 exchanges data with the mobile communication device 1 using the communication network 3. The content identity server 6 is separate from the virtual real estate directory system 4. For example, the content identity server 6 is located near the location to which the virtual real estate object 41 is assigned.

In an embodiment, the content identity server 6 is located at the same location as the virtual real estate directory system 4.

The content identity server 6 stores cryptographic keys 61 which are used by the mobile communication device 1 to validate augmented reality content 51 stored on the augmented reality content servers 5, as explained in more detail with reference to FIG. 11 below.

Figure 8:
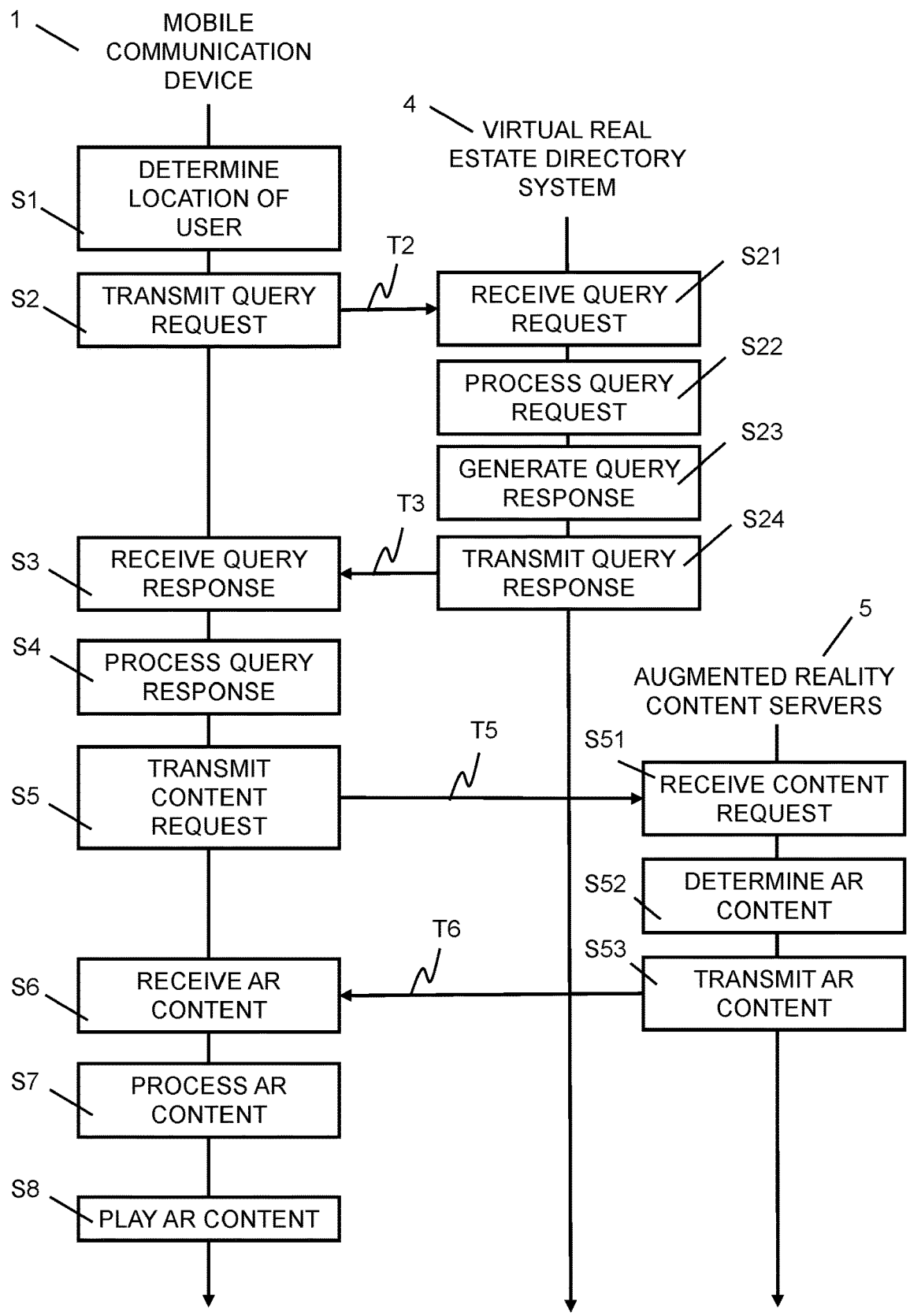
FIG. 8: shows a flow diagram illustrating a sequence of steps for providing augmented reality content to a user.

FIG. 8 shows a flow diagram illustrating a sequence of steps for providing augmented reality content 51 to the user 2 of a mobile communication device 1.

In step S1, the location 21 of the user 2 is determined. The location 21 of the user 2 is determined by the electronic circuit 13 of the mobile communication device 1. The location module of the mobile communication device 1 determines the location 21 using signal trilateration, for example from a global navigation satellite system such as GPS (Global Positioning System), Glonass, and/or Galileo. In an embodiment, the location module further uses the presence of other radio networks, such as mobile radio or WLAN networks, to determine the location 21 of the user 2, for example by trilateration. In an embodiment, the location module further uses beacons, such as Bluetooth or ultra-wideband beacons for determining the location 21 of the user 2, which is particularly advantageous indoors where a precise determination of the location 21 of the user 2 may not be possible using satellite-based systems.

In an embodiment, a device separate from the mobile communication device 1 of the user 2 determines the location 21 of the user 2 and transmits the location 21 to the mobile communication device 2.

In step S2, the mobile communication device 1 transmits in a transmission T2 a query request to the virtual real estate directory system 4 using the communication network 3. The query request comprises the location 21 of the user 2. In an embodiment, the query request further comprises an orientation of the user 2, a field of view F of the user 2, a user identifier of the user 2, a device identifier of the mobile communication device 1, a network address of the mobile communication device 1, a device type of the mobile communication device 1, a hardware configuration of the mobile communication device 1, and/or a movement velocity of the user 2 of the communication device 1. The hardware configuration of the mobile communication device 1 comprises the hardware modules the mobile communication device 1 has.

In step S21, the query request is received in the virtual real estate directory system 4 from the mobile communication device 1. The query request is received in the server computer system. In particular, the query request is received in a specific server computer of the server computer system.

In step S22, the virtual real estate directory system 4 processes the query request. The query request is processed in the server computer system. Processing the query request comprises the specific server computer of the virtual real estate directory system 4 which received the query request to check whether the query request is to be forwarded to another server computer of the virtual real estate directory system 4. The query request is to be forwarded depending on one or more of the following factors: the location 21 of the user 2, the user identifier of the user 2, the device identifier of the mobile communication device 1, and the network address of the mobile communication device 1. In particular, depending on the location 21 of the user 2, the query request is forwarded to one or more further server computers of the virtual real estate directory system 4, which are responsible for the geographic area of the location 21 of the user 2, meaning that they comprise virtual real estate objects 41 assigned to virtual real estate locations 42 in the geographic area of the location 21 of the user 2. In an embodiment, forwarding the query request in the virtual real estate directory system 4 comprises one or more individual forwarding steps, where a given receiving server computer forwards the query request to one or more further server computers, which in turn process and forward the query result to other server computers. In this manner, the query request traverses the server computers arranged in the hierarchical system and/or hierarchical database.

In step S23, the virtual real estate directory system 4 generates a query response. The query response comprises virtual real estate objects 41 located near the location 21 of the user 2. In particular, the query response comprises virtual real estate objects 41 assigned to a virtual real estate location 42 within the region R around the location 21 of the user 2. In an embodiment, the query response comprises virtual real estate objects 41 located in the field of view F. For example, the query response comprises virtual real estate objects 41 stored on one or more server computers of the virtual real estate directory system 4. In particular, the query response may comprise a plurality of query response messages from a plurality of server computers of the virtual real estate directory system 4, each query response message comprising virtual real estate objects 41 assigned to virtual real estate locations 42 within the region R around the location 21 of the user 2. For example, a server computer of the virtual real estate directory system 4, responsible for a city, may generate a query response message with large virtual real estate objects 41 corresponding to city blocks, landmarks, and/or natural geographic features, and another server computer of the virtual real estate directory system 4, responsible for a particular building, may generate another query response message with smaller virtual real estate objects 41, corresponding to the particular building along with particular floors, units, and/or areas of the building.

In step S24, the query response is transmitted, in a transmission T3, from the virtual real estate directory system 4 to the mobile communication device 1 via the communication network 3. The query response is transmitted from the server computer system of the virtual real estate directory system 4 and comprises one or more individual query response messages from one or more server computers of the virtual real estate directory system 4.

In step S3, the query response is received in the mobile communication device 1. The query response comprises one or more virtual real estate objects 41. As explained above under FIG. 5, each virtual real estate object 41 comprises the virtual real estate object location 42, the identification information 43, the network address 44 of the augmented reality content server, and the bounding volume V.

In step S4, the query response is processed in the mobile communication device 1. Depending on the embodiment and/or configuration, processing the query response comprises the mobile communication device 1 using the orientation of the user 2 and/or the field of view F to generate a sub-set of virtual real estate objects 41 with a virtual real estate object location 42 located in the direction of the orientation of the user 2 and/or within the field of view F of the user 2. Furthermore, processing the query response may comprise the mobile communication device 1 using a movement velocity of the user 2 to generate a sub-set of virtual real estate objects 41 with a virtual real estate object location 42 located in the direction in which the user 2 is moving. The query response is stored in the mobile communication device 1.

In an embodiment, the virtual real estate object 41 is displayed on the display 11 of the mobile communication device 1, such that the virtual real estate object 41 appears on the display 11 overlaid over the real-world in a semi-transparent or translucent manner at the virtual real estate object location 42. In an embodiment, this comprises displaying the bounding volume V of the virtual real estate object 41.

The mobile communication device 1 generates a content request for each virtual real estate object 41 that the mobile communication device 1 received in the query response. In an embodiment, the mobile communication device 1 generates a content request only for those virtual real estate objects 41 of the sub-set of virtual real estate objects 41. Each particular content request comprises the identification information 43 of the particular virtual real estate object 41. Additionally, each particular content request may comprise the user identifier of the user 2, the device identifier of the mobile communication device 1, the network address of the mobile communication device 1, the device type of the mobile communication device 1, and/or the hardware configuration of the mobile communication device 1.

In step S5, the mobile communication device 1 transmits, in a transmission T5 via the communication network 3, one or more content requests to one or more augmented reality content servers 5 using the specific network address 44 of each specific augmented reality content server 5. Depending on the embodiment and/or scenario, the mobile communication device 1 transmits one or more content requests to each augmented reality content server 5.

In step S51, the augmented reality content servers 5 receive the content requests. Each augmented reality content server 5 may receive one or more content requests from the mobile communication device 1.

In step S52, the each augmented reality content server 5 determines augmented reality content 51 using the content request. In particular, the identification information 43 of each particular virtual real estate object 41 is used to determine augmented reality content 51 assigned to that particular virtual real estate object 41. Additionally, the hardware configuration of the mobile communication device 1 may be used to determine augmented reality content 51. In particular, whether visual content, haptic content, and/or auditory content is included in the augmented reality content 51 depends on whether the hardware configuration indicates that the mobile communication device 1 has hardware modules which can play back a given content type. Additionally, the user identifier of the user 2 of the mobile communication device 2 is used to determine whether the augmented reality content 51, as a given user 2 may not have access rights for particular augmented reality content 51.

In step S53, augmented reality content 51 is transmitted in a transmission T6 from the one or more of the augmented reality content servers 5 to the mobile communication device 1 via the communication network 3. In particular, each augmented reality content server 5 transmits one or more augmented reality content messages to the mobile communication device 1. In addition to the augmented reality content 51, the transmission T6 also comprises the identification information 43 of each particular virtual real estate object 41 to which the augmented reality content 51 is assigned.

In step S6, augmented reality content 51 is received in the mobile communication device 1 from one or more of the augmented reality content servers 5 via the communication network 3. In particular, each augment reality content server 5 transmits one or more augmented reality content messages.

In step S7, the augmented reality content 51 received is processed in the mobile communication device 1. The augmented reality content 51 is processed by associating the augmented reality content 51 with a specific virtual real estate object 41 by matching the identification information 43 of the specific virtual real estate object 41 as stored in the mobile communication device 1 with the identification information 43 as received in the transmission T6.

In step S8 the augmented reality content 51 is played back in the mobile communication device 1. Depending on the specific type of mobile communication device 1 and/or the hardware configuration of the mobile communication device 1, playing back the augmented reality content 51 comprises displaying visual content included in the augmented reality content 51 (e.g. displaying on the display 11 an image), playing auditory content (e.g. playing back using the audio module 14 an audio track), and/or rendering other types of content.

The augmented reality content 51 is played back such that the augmented reality content 51 is located (mapped and arranged) in the virtual real estate object 41. For example, if the augmented reality content 51 comprises visual content, this visual content will appear on the display 11 in the virtual real estate object 41 at the virtual real estate object location 42. In particular, the visual content will be rendered inside the bounding volume V of the virtual real estate object 41. Further, if the augmented reality content 51 comprises auditory content, the auditory content will be played back as if originating from a virtual audio source inside the virtual real estate object 41 at the virtual real estate object location 42. Further, the mobile communication device 1 is configured such that only if the location 21 of the user 2 is inside the virtual real estate object 41 or its bounding volume V auditory content is played back to the user 2 using the audio module 14.

In an embodiment where the mobile communication device 1 comprises the display 11, the visual content of the augmented reality content 51 is displayed as an image of augmented reality content 51 overlaid on an image of the real world.

In an embodiment where the mobile communication device 1 is a smart phone, the electronic circuit 13 is configured to direct the camera 12 to capture an image of the real-world and to direct the display 11 to display the image of the real-world. The electronic circuit 13 then renders the image (visual content) of the augmented reality content 51 on the display 11, such that both the real-world and the augmented reality content 51 are displayed simultaneously, with the visual content overlaid on the image of the real-world.

In an embodiment where the mobile communication device comprises smart-glasses, the electronic circuit is configured to display the visual content of the augmented reality content 51 on the display 11 such that the augmented reality content 51 is overlaid over the image of the real-world as seen by the user 2 wearing the smart-glasses.

In an embodiment where the augmented reality content 51 comprises interactive content, playing back the augmented reality content 51 comprises the mobile communication device 1 registering one or more interaction actions of the user 2 interacting with the interactive content and modifying or changing the interactive content based on the interaction actions of the user 2. The interaction actions are registered using one or more modules of the mobile communication device 1, for example the location module which registers a movement of the user 2, which movement can be registered as an interaction with the interactive content, and/or the user interface module which registers user input of the user 2 which can register one or more interactive actions of the user 2.

In an embodiment, the interactive actions of the user 2 are transmitted, via the communication network 3, from the mobile communication device 1 to the augmented reality content server 5 which provided the particular augmented reality content 51 with which the user 2 interacted.

Figure 9:
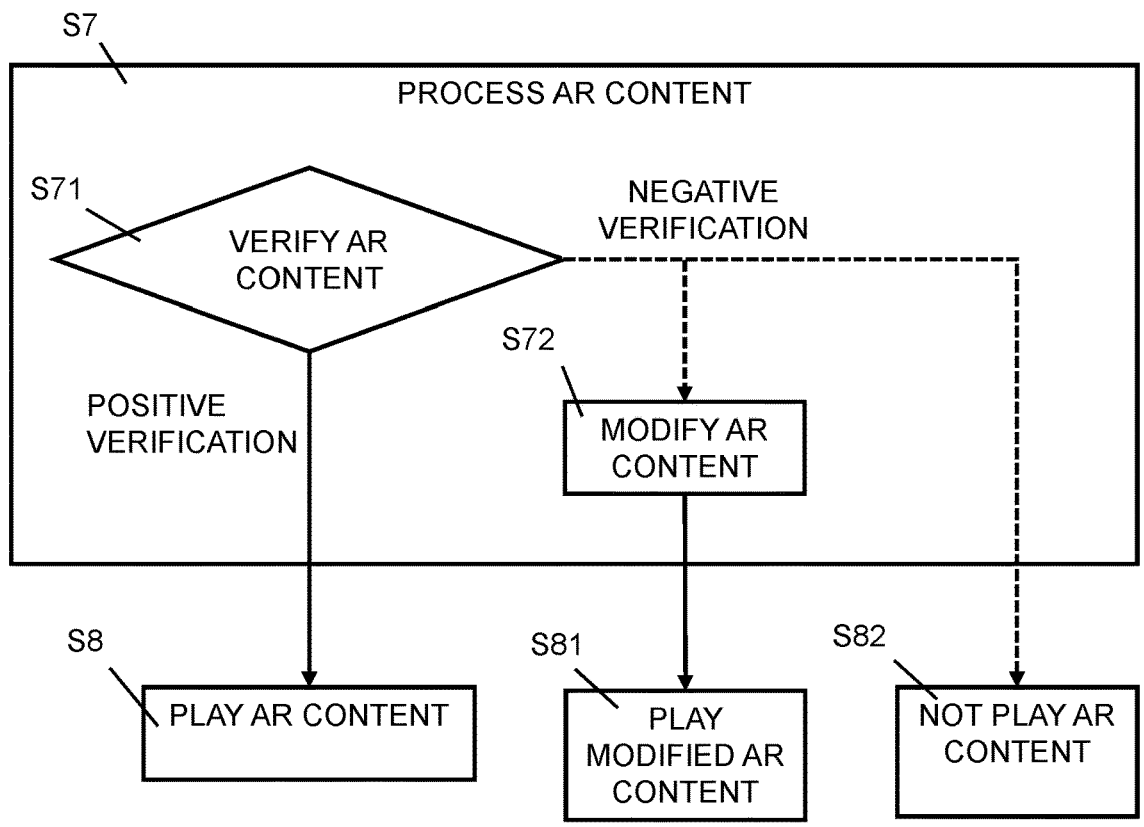
FIG. 9: shows a flow diagram illustrating a sequence of steps for processing augmented reality content.

FIG. 9 shows a flow diagram illustrating an exemplary sequence of steps for processing augmented reality content 51 according to an embodiment of the invention. In step S71, the electronic circuit 13 of the mobile communication device 1 verifies whether the augmented reality content 51 fits inside the bounding volume V of the virtual real estate object. In particular, the electronic circuit 13 verifies that the visual content of the augmented reality content 51 does not extend beyond the bounding volume V. If the visual content, such as a 3D model or image, does not extend beyond the bounding volume V of the virtual real estate object 51, then a positive verification is generated in the electronic circuit 13 and step S8 is executed by the electronic circuit 13, as described in more detail above in relation to FIG. 8. If the visual content does extend beyond the bounding volume V of the virtual real estate object 51, then a negative verification is generated in the electronic circuit 13 and the electronic circuit proceeds to either step S72 or S82, depending on a configuration of the mobile communication device 1. In step S82, the electronic circuit 13 does not play the augmented reality content 51. In step S72, the augmented reality content 51 is modified such that it fits inside, i.e. does not extend beyond, the bounding volume V of the augmented reality content 51. This modification of the augmented reality content 51 allows the mobile communication device 1 to play back augmented reality content 51 in step S81, without the augmented reality content 51 extending beyond the virtual real estate object 41 and without extending into a neighboring virtual real estate object 41.

Figure 10:
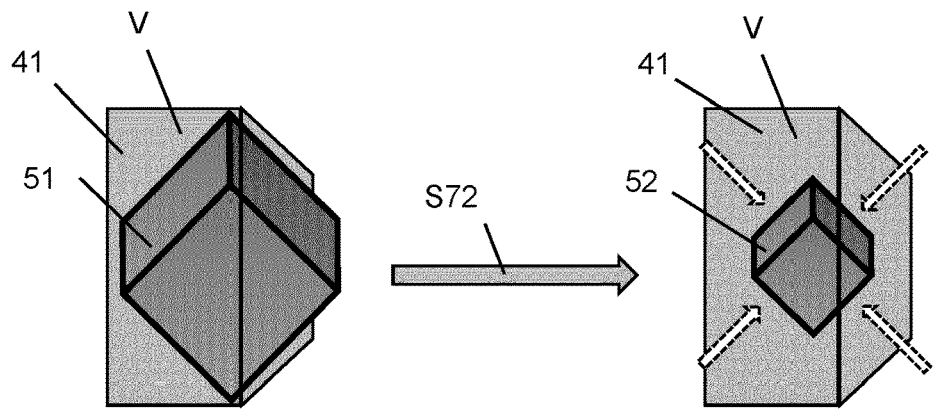
FIG. 10: shows a block diagram illustrating modification of augmented reality content.

FIG. 10 shows a block diagram illustrating modification of augmented reality content 51 according to an embodiment of the invention. The augmented reality content 51, in particular the visual content of the augmented reality content 51, is resized, reshaped, truncated, and/or otherwise modified in step S72, such that it fits inside the bounding volume of the virtual real estate object 41.

Figure 11:
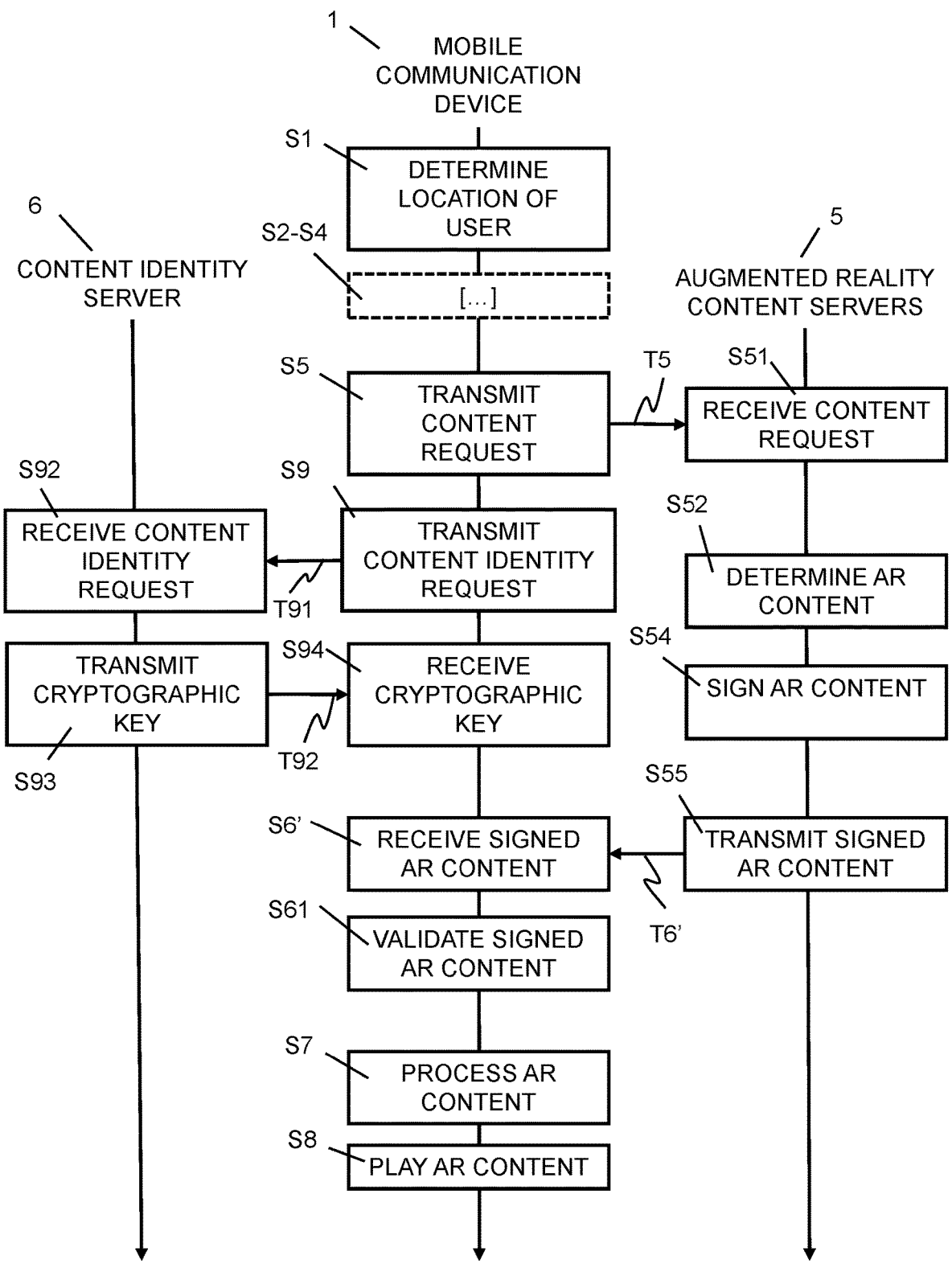
FIG. 11: shows a flow diagram illustrating a sequence of steps for providing augmented reality content to a user.

FIG. 11 shows a flow diagram illustrating an exemplary sequence of steps for providing augmented reality content 51 to a user 2. With regards to steps S1 to S5, and S7 and S8 reference is made to the above description provided with reference to FIG. 8. In step S54, the augmented reality content server 5 signs augmented reality content 51 using an encryption key. Signing the augmented reality content 51 may further comprise encrypting the augmented reality content 51 using the encryption key. Each piece of augmented reality content 51 may be signed using the same or a different encryption key.

In an embodiment, the augmented reality content 51 is previously signed by the content identity server 6 and transmitted to and stored on the augmented reality content server 5.

In step S55 the signed augmented reality content is then transmitted in a transmission T6' from the augmented reality content server 5 to the mobile communication device 1. The mobile communication device 1 transmits, in step S9, a content identity request to a content identity server 6. The content identity server 6 can be separate from, or integrated into, the virtual real estate directory system 4. The content identity request comprises identification information 43 of the virtual real estate objects 41 within the region R around the location 21 of the user 2. In step S93, the content identity server 6 transmits in a transmission T92 one or more cryptographic keys 61 to the mobile communication device 1. Depending on the embodiment, the one or more encryption keys used by the augmented reality content servers 5 to sign the augmented reality content 51 are the same as or different from the one or more cryptographic keys 61 received from the content identity server 6. In step S61, the mobile communication device 1 uses the cryptographic keys 61 to validate the signed augmented reality content. Validation comprises validating the identity of the augmented reality content servers 5. Validation may further comprise decrypting the signed augmented reality content 51.

In an embodiment, the encryption key and the cryptographic key 61 form an asymmetric key pair.

In an embodiment, the encryption key and the cryptographic key 61 form a symmetric key pair.

It should be noted that, in the description, the sequence of the steps has been presented in a specific order, one skilled in the art will understand, however, that the order of at least some of the steps could be altered, without deviating from the scope of the invention.

What is claimed is:

1. A mobile communication device, comprising an electronic circuit configured to:
    determine a location of a user of the mobile communication device;
    transmit a query request via a communication network to a computerized virtual real estate directory system, the query request comprising at least the location of the user;
    receive from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;
    transmit for at least one particular virtual real estate object a content request via the communication network to one of the augmented reality content servers, respectively using the network address of the augmented reality content server, each content request comprising the identification information of the particular virtual real estate object;
    receive from the augmented reality content server via the communication network augmented reality content for the particular virtual real estate object; and
    play the augmented reality content for the particular virtual real estate object;
    wherein the mobile communication device further comprises an audio module and wherein the electronic circuit is configured to play the augmented reality content using the audio module.

2. The mobile communication device of claim 1, wherein the mobile communication device further comprises a display and wherein the electronic circuit is configured to play the augmented reality content by rendering, on the display, the augmented reality content.

3. The mobile communication device of claim 1, wherein the electronic circuit is further configured to:
    Verify whether the augmented reality content is entirely contained within a bounding volume of the virtual real estate object;
    responsive to positive verification, play the augmented reality content; and
    responsive to negative verification to either:
    not play the augmented reality content or
    modify the augmented reality content and play on the display modified augmented reality content fitting within the bounding volume of the virtual real estate object.

4. The mobile communication device of claim 1, wherein the mobile communication device further comprises a camera and the electronic circuit is configured to further determine a field of view of the user and/or of the camera and to transmit the query request further comprising the field of view.

5. The mobile communication device of claim 1, wherein the electronic circuit is further configured to:
    determine from the field of view coordinates of real-world features in the field of view relative to the location of the user, and
    transmit, in the query request, the coordinates of the real-world features.

6. The mobile communication device of claim 1, wherein the electronic circuit is further configured to:
    Receive from a content identity server, via the communication network, at least one cryptographic key assigned to the at least one augmented reality content server, respectively;
    receive from the at least one augmented reality content server via the communication network signed augmented reality content for the virtual real estate objects; and
    validate the signed augmented reality content received from the at least one augmented reality content server using the corresponding at least one cryptographic key.

7. A method of providing augmented reality content to a user of a mobile communication device having an electronic circuit, the method comprising:
    determining in the mobile communication device a location of the user of the mobile communication device;
    transmitting from the mobile communication device a query request via a communication network to a computerized virtual real estate directory system, the query request comprising at least the location of the user;
    receiving in the mobile communication device from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;
    transmitting from the mobile communication device for at least one particular virtual real estate object a content request via the communication network to one of the augmented reality content servers, respectively using the network address of the augmented reality content server, each content request comprising the identification information of the particular virtual real estate object;
    receiving in the mobile communication device from the augmented reality content server via the communication network the augmented reality content for the particular virtual real estate object; and playing in the mobile communication device the augmented reality content for the particular virtual real estate object;

wherein the mobile communication device comprises an audio module and wherein playing the augmented reality content comprises playing the augmented reality content using the audio module.

8. The method of claim 7, wherein the mobile communication device comprises a display and wherein playing the augmented reality content comprises rendering, on the display, the augmented reality content.

9. The method of claim 7, wherein the method further comprises:

verifying in the mobile communication device whether the augmented reality content is entirely contained within a bounding volume of the virtual real estate object;

responsive to positive verification, playing the augmented reality content; and responsive to negative verification either:

not playing the augmented reality content or modifying in the mobile communication device the augmented reality content and playing modified augmented reality content fitting within the bounding volume of the virtual real estate object.

10. The method of claim 7, wherein the method further comprises determining in the mobile communication device a field of view of the user and/or of a camera of the mobile communication device and transmitting from the mobile communication device the query request further comprising the field of view.

11. The method of claim 10, wherein the method further comprises:

determining, in the mobile communication device, from the field of view coordinates of real-world features in the field of view relative to the location of the user and transmitting, from the mobile communication device, in the query request, the coordinates of the real-world features.

12. The method of claim 7, wherein the method further comprises:

receiving in the mobile communication device from a content identity server, via the communication network, at least one cryptographic key assigned to the at least one augmented reality content server, respectively;

receiving in the mobile communication device from the at least one augmented reality content server via the communication network signed augmented reality content for the virtual real estate objects; and validating in the mobile communication device the signed augmented reality content received from the at least one augmented reality content server using the corresponding at least one cryptographic key.

13. A computer program product comprising a non-transitory computer-readable medium having stored thereon computer program code configured to control an electronic circuit of a mobile communication device such that the mobile communication device performs the method comprising:

determining in the mobile communication device a location of the user of the mobile communication device;

transmitting from the mobile communication device a query request via a communication network to a computerized virtual real estate directory system, the query request comprising at least the location of the user;

receiving in the mobile communication device from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;

transmitting from the mobile communication device for at least one particular virtual real estate object a content request via the communication network to one of the augmented reality content servers, respectively using the network address of the augmented reality content server, each content request comprising the identification information of the particular virtual real estate object;

receiving in the mobile communication device from the augmented reality content server via the communication network the augmented reality content for the particular virtual real estate object; and playing in the mobile communication device the augmented reality content for the particular virtual real estate object;

wherein the mobile communication device further comprises an audio module and wherein the electronic circuit is configured to play the augmented reality content using the audio module.

14. A mobile communication device, comprising an electronic circuit configured to:

determine a location of a user of the mobile communication device;

transmit a query request via a communication network to a computerized virtual real estate directory system, the query request comprising at least the location of the user;

receive from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;

transmit for at least one particular virtual real estate object a content request via the communication network to one of the augmented reality content servers, respectively using the network address of the augmented reality content server, each content request comprising the identification information of the particular virtual real estate object;

receive from the augmented reality content server via the communication network augmented reality content for the particular virtual real estate object; and play the augmented reality content for the particular virtual real estate object;

wherein the electronic circuit is further configured to:

verify whether the augmented reality content is entirely contained within a bounding volume of the virtual real estate object;

responsive to positive verification, play the augmented reality content; and responsive to negative verification to either:

not play the augmented reality content or modify the augmented reality content and play on the display modified augmented reality content fitting within the bounding volume of the virtual real estate object.

15. A mobile communication device, comprising an electronic circuit configured to:
   determine a location of a user of the mobile communication device;
   transmit a query request via a communication network to a computerized virtual real estate directory system, the query request comprising at least the location of the user;
   receive from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;
   transmit for at least one particular virtual real estate object a content request via the communication network to one of the augmented reality content servers, respectively using the network address of the augmented reality content server, each content request comprising the identification information of the particular virtual real estate object;
   receive from the augmented reality content server via the communication network augmented reality content for the particular virtual real estate object; and
   play the augmented reality content for the particular virtual real estate object;
   wherein the mobile communication device further comprises a camera and the electronic circuit is configured to further determine a field of view of the user and/or of the camera and to transmit the query request further comprising the field of view.

16. A mobile communication device, comprising an electronic circuit configured to:
   determine a location of a user of the mobile communication device;
   transmit a query request via a communication network to a computerized virtual real estate directory system, the query request comprising at least the location of the user;
   receive from the virtual real estate directory system via the communication network a query response, the query response comprising one or more virtual real estate objects assigned to a virtual real estate object location within a predefined region around the user, each of the virtual real estate objects comprising identification information and a network address of an augmented reality content server;
   transmit for at least one particular virtual real estate object a content request via the communication network to one of the augmented reality content servers, respectively using the network address of the augmented reality content server, each content request comprising the identification information of the particular virtual real estate object;
   receive from the augmented reality content server via the communication network augmented reality content for the particular virtual real estate object; and
   play the augmented reality content for the particular virtual real estate object;
   wherein the electronic circuit is further configured to:
   receive from a content identity server, via the communication network, at least one cryptographic key assigned to the at least one augmented reality content server, respectively;
   receive from the at least one augmented reality content server via the communication network signed augmented reality content for the virtual real estate objects; and
   validate the signed augmented reality content received from the at least one augmented reality content server using the corresponding at least one cryptographic key.

* * * * *